United States Patent
Koskinen

(10) Patent No.: US 7,455,483 B2
(45) Date of Patent: Nov. 25, 2008

(54) MILLING INSERT AND A MILLING TOOL

(75) Inventor: Jorma Koskinen, Fagersta (SE)

(73) Assignee: Seco Tools AB, Fagersta (SE)

( * ) Notice: Subject to any disclaimer, the term of this patent is extended or adjusted under 35 U.S.C. 154(b) by 208 days.

(21) Appl. No.: 11/470,756

(22) Filed: Sep. 7, 2006

(65) Prior Publication Data

US 2007/0071559 A1    Mar. 29, 2007

(30) Foreign Application Priority Data

Sep. 28, 2005    (SE) .................................. 0502139

(51) Int. Cl.
*B23C 5/20* (2006.01)
*B23C 5/00* (2006.01)

(52) U.S. Cl. .................. 407/113; 407/114; 407/115; 407/116

(58) Field of Classification Search .......... 407/113–116
See application file for complete search history.

(56) References Cited

U.S. PATENT DOCUMENTS

| | | | | |
|---|---|---|---|---|
| 5,207,538 A | * | 5/1993 | Satran | 407/113 |
| 5,232,319 A | * | 8/1993 | Satran et al. | 407/114 |
| 5,454,670 A | * | 10/1995 | Noda et al. | 407/42 |
| 5,803,674 A | * | 9/1998 | Satran et al. | 407/42 |
| 5,951,214 A | * | 9/1999 | Rothballer et al. | 407/42 |
| 6,648,560 B2 | * | 11/2003 | Andras | 407/109 |
| 7,021,871 B2 | * | 4/2006 | Arvidsson et al. | 407/113 |

FOREIGN PATENT DOCUMENTS

| EP | 0707911 A1 | 4/1996 |
|---|---|---|
| WO | 0013831 A1 | 3/2000 |

OTHER PUBLICATIONS

International Search Report from corresponding International Application PCT/SE2006/001035.

* cited by examiner

*Primary Examiner*—Willmon Fridie
(74) *Attorney, Agent, or Firm*—WRB-IP LLP

(57) ABSTRACT

The present invention relates to an indexable milling insert and a milling tool for chip removing machining. The milling insert is intended to be able to mill substantially perpendicular corners in a work piece. The milling insert comprises an upper side, a lower side and edge surfaces extending therebetween. The upper side and the lower side are substantially identical. An imaginary circle inscribed in the milling insert touches the milling insert periphery in four to six points. Lines of intersection between the edge surfaces and the sides form relative to each other substantially perpendicular main cutting edges and minor cutting edges. Each of the sides includes a support surface, each of which being provided in a plane. Each minor cutting edge projects from the plane of the associated support surface. Each major cutting edge intersects the plane of the associated support surface.

21 Claims, 4 Drawing Sheets

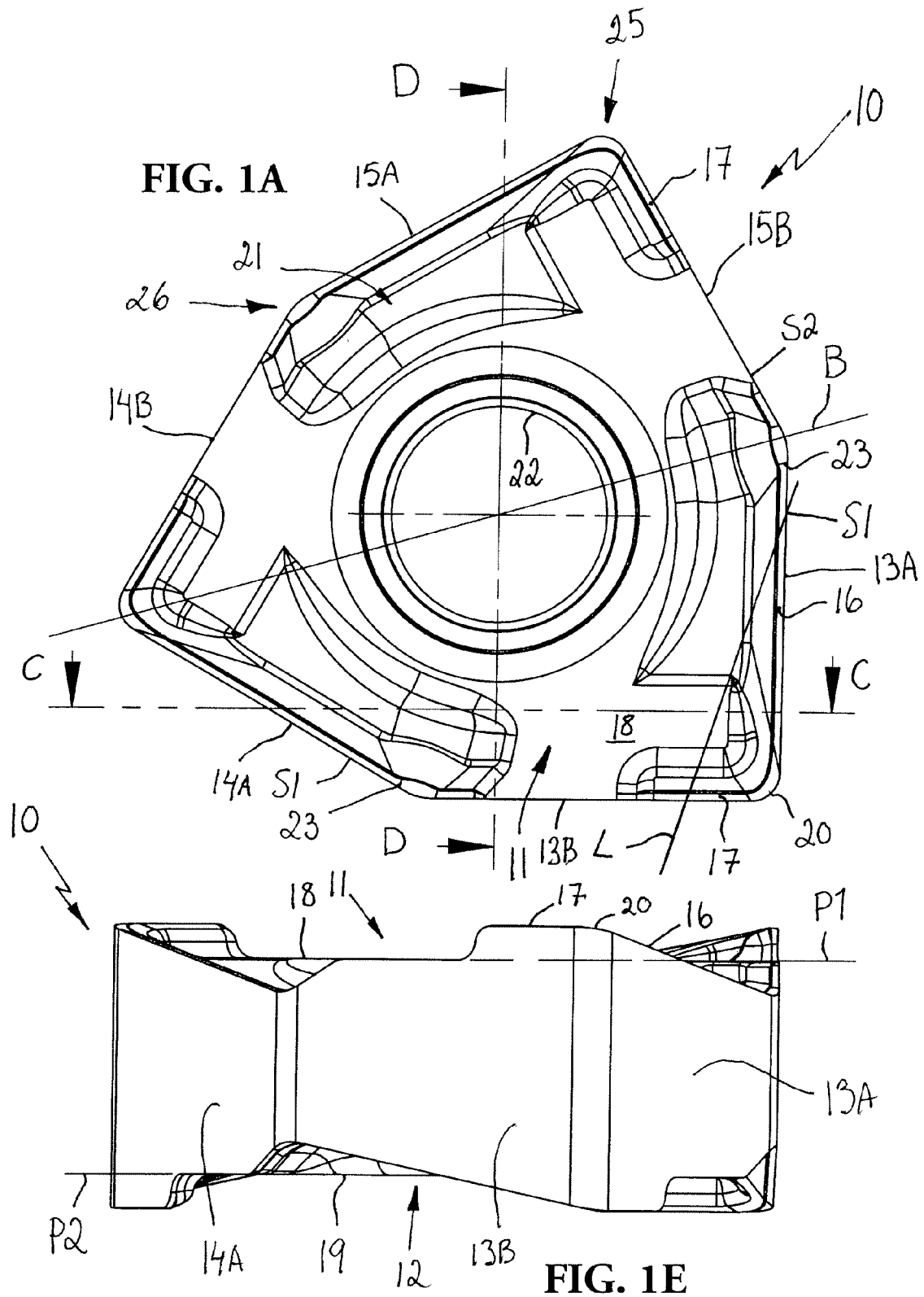

US 7,455,483 B2

MILLING INSERT AND A MILLING TOOL

BACKGROUND AND SUMMARY

The present invention relates to a milling insert and a milling tool for chip removing machining.

Milling inserts for milling of 90° corners in metallic workpieces are previously known, see for example U.S. Pat. No. 6,142,716. Drawbacks of known milling inserts are that they are relatively expensive to use and provides unstable localization.

It is desirable to provide an economically advantageous milling insert for milling of 90° corners in metallic workpieces.

It is desirable to provide a milling insert for milling, which enables rigid localization of the milling insert in a milling body.

According to an aspect of the present invention an indexable milling insert is provided for milling substantially perpendicular corners in a work piece, the milling insert including an upper side, a lower side, and edge surfaces extending between the upper and lower sides, the upper and lower sides being substantially identical, wherein an imaginary circle inscribed in the milling insert touches a periphery of the milling insert at between four to six points, wherein lines of intersection between the edge surfaces and the upper and lower sides form substantially perpendicular main cutting edges and associated minor cutting edges, each of the upper and lower sides each including a respective support surface, each support surface being provided in a respective plane, wherein each major cutting edge intersects the plane of an associated one of the support surfaces, and each associated minor cutting edge projects from the plane of the associated one of the support surfaces.

According to another aspect of the present invention, a milling tool comprising a milling body with a number of insert pockets is provided, wherein each milling insert pocket is intended to receive a milling insert as described above.

BRIEF DESCRIPTION OF THE DRAWINGS

The features and advantages of the present invention are well understood by reading the following detailed description in conjunction with the drawings in which like numerals indicate similar elements and in which:

FIG. 1A shows a milling insert according to the present invention in a top view;

FIG. 1E shows the milling insert in a side view;

DETAILED DESCRIPTION

Figure 1F:
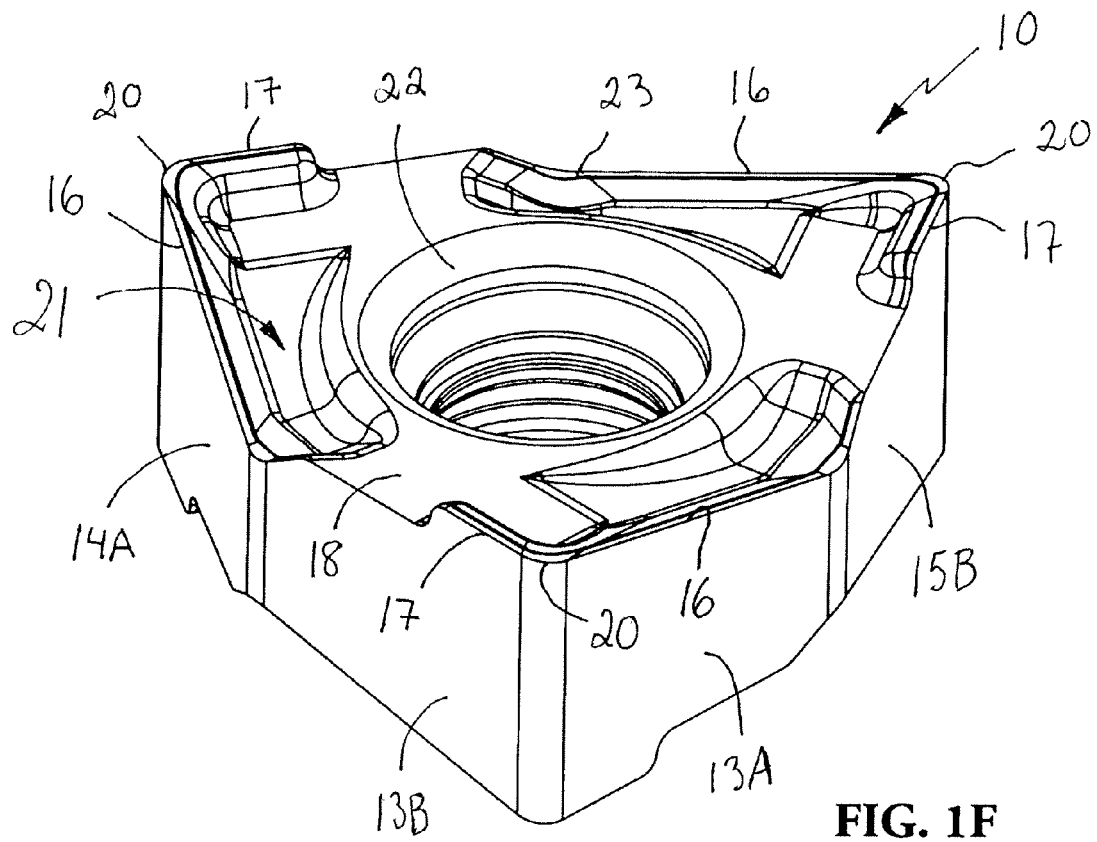
FIG. 1F shows the milling insert in a perspective view.
Figure 1B:
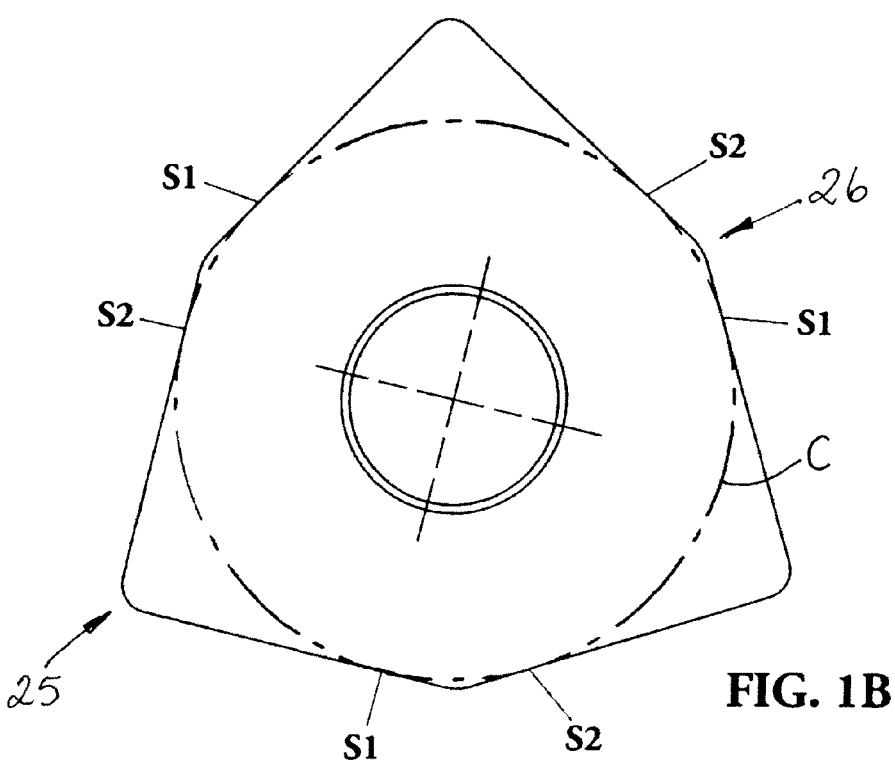
FIG. 1B shows the basic shape of the milling insert in a top view.
Figure 1D:
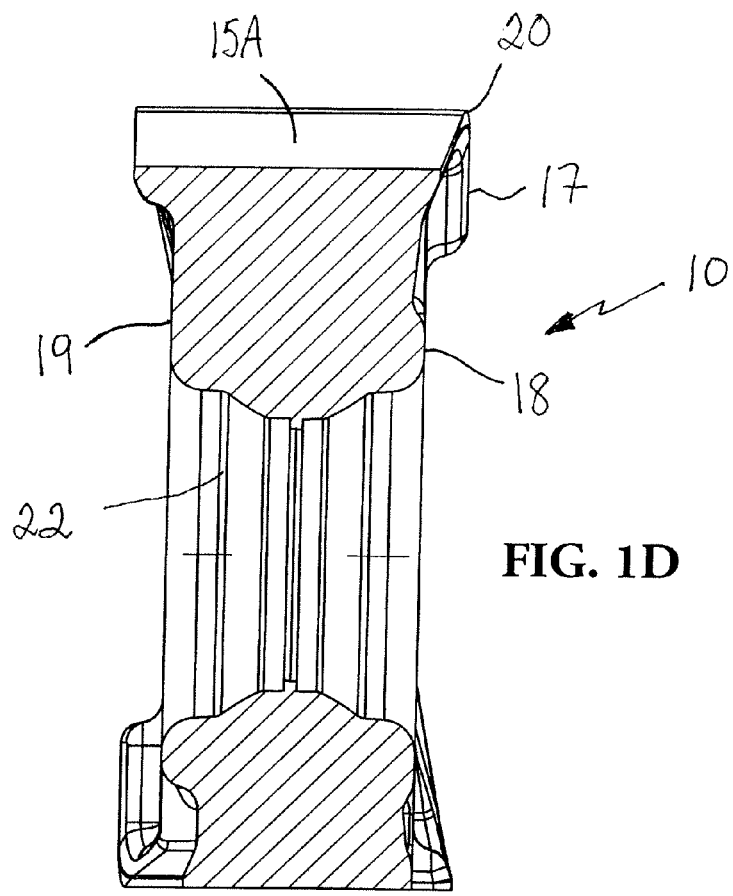
FIG. 1D shows the milling insert in cross-section according to the line D-D in FIG. 1A.
Figure 1C:
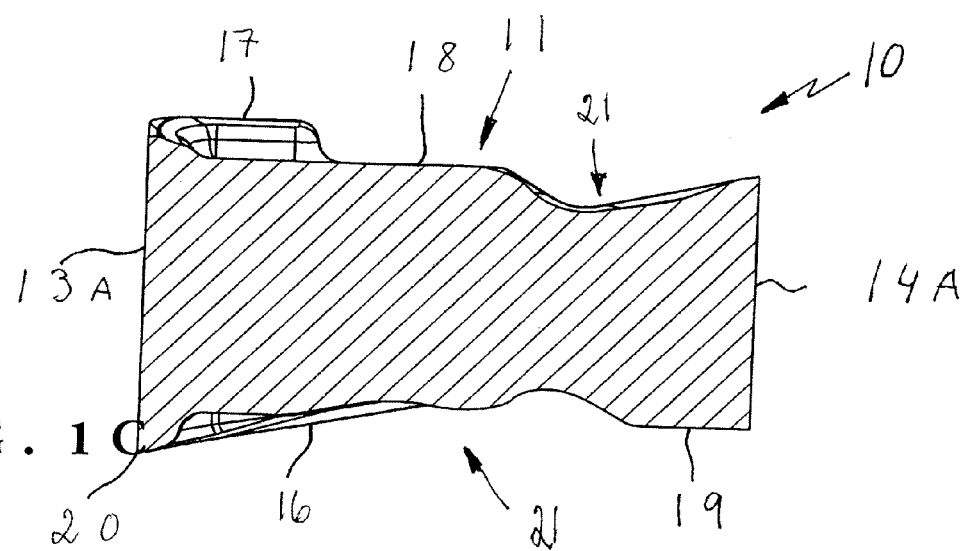
FIG. 1C shows the milling insert in cross-section according to the line C-C in FIG. 1A.
Figure 2A:
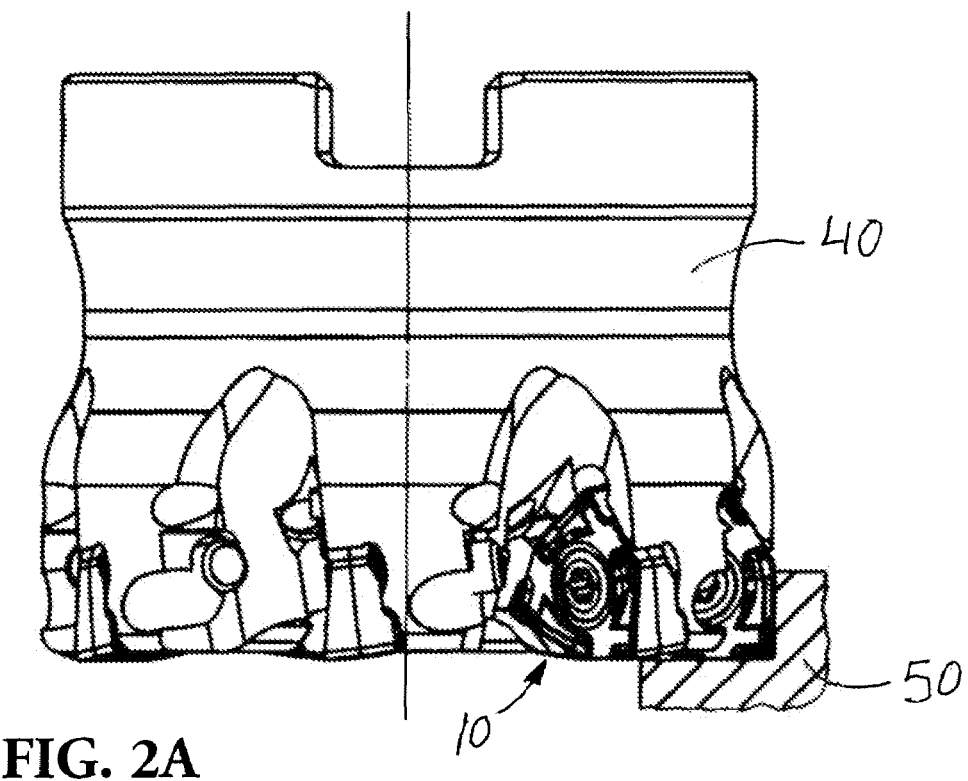
FIG. 2A shows a milling tool according to the present invention equipped with milling inserts according to the present invention.
Figure 2B:
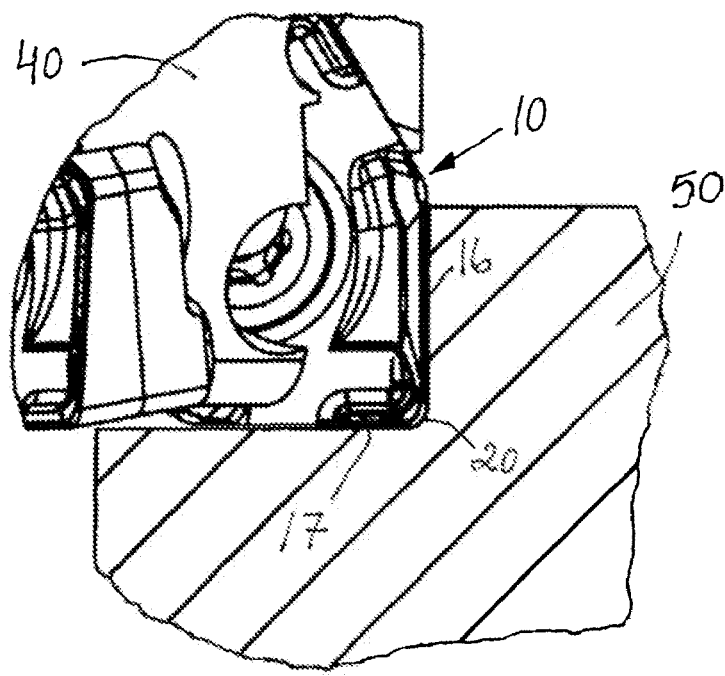
FIG. 2B shows an enlarged part of the milling tool in FIG. 2A.

FIGS. 1A-1F show a double sided or indexable cutting insert 10 for milling, hereinafter called milling insert, according to the present invention. The milling insert 10 has a trigon-shaped or hexagonal basic shape and is made of directly pressed hard metal. Alternatively, the milling insert can have four or five corners. With "hard metal" is here meant WC, TiC, TaC, NbC, etc., in sintered combination with a binder metal such as for example Co or Ni. The milling insert is preferably at least partly coated with layer of for example Al2O3, TiN and/or TiCN. In certain cases there can be well-founded that the cutting edges are made of brazed on super hard materials such as CBN or PCD. In FIG. 1B the basic shape of the milling insert is shown where 25 depicts right angled cutting corners provided with edges, whereof one corner is active at the time, and where 26 depicts blunt passive corners. The blunt corners 26 do normally not cut during milling. The milling insert is intended to be mounted in a milling body intended to be rotated in a milling machine. The milling body includes at least one milling insert pocket in order to receive the milling insert. The milling insert 10 is intended to be able to mill substantially perpendicular corners in a work piece 50, FIG. 2B. The milling insert 10 includes an upper side 11, a lower side 12 and edge surfaces 13A, 13B, 14A, 14B, 15A, 15B extending there between. The upper side 11 and the lower side 12 are substantially identical. An imaginary circle C inscribed in the milling insert 10 touches the milling insert periphery at six points S1, S2. In an alternative, square milling insert an imaginary circle, inscribed in the milling insert, touches the milling insert periphery at four points. In an additional alternative, pentagonal milling insert an imaginary circle, inscribed in the milling insert, touches the milling insert periphery at five points. Lines of intersection between the edge surfaces and the sides form relative to each other, in a top view according to FIG. 1A, substantially perpendicular main cutting edges 16 and minor cutting edges 17 which intersect at cutting corners 25 via a nose edge 20. Each side 11, 12 include as support surface 18, 19, each being provided in a plane P1 and P2, respectively. The support surface 18 or 19 is intended to abut against a base surface in the milling insert pocket. The planes P1, P2 are preferably parallel such that the milling insert mounted in the milling body discloses the same properties irrespective of which side 11, 12 that has been put forward. Each minor cutting edge 17 projects from the plane P1, P2 for the associated support surface 18, 19, such that the minor cutting edge reaches the farthest in the axial direction of the milling cutter of all parts of the milling insert when the milling insert has been mounted in the milling insert pocket. With the term "associated" is here meant "provided on the same side as" or "cooperating during milling with". Each major cutting edge 16 intersects the plane P1, P2 for associated support surface and forms an acute angle α with the plane P1, P2. The angle α is 5-20°, preferably 10-16°. The angle α gives the main cutting edge an easy cutting, positive axial angle when the milling insert has been mounted in the milling insert pocket. Each minor cutting edge 17 is provided distant from all of the points S1 and S2. Each major cutting edge 16 includes one of the points S1. A line L that intersects a point S1 on a major cutting edge 16 and intersects the associated minor cutting edge 17 milling insert also intersects an associated support surface 18, 19, when the milling insert is seen in a top view according to FIG. 1A. This means that the support surface 18, 19 can reach close to the active the cutting edges such that the cutting forces from the milling operation can be transferred to the milling body without the milling insert breaking. Each minor cutting edge 17 extends substantially parallel with the plane P1, P2, such as illustrated in FIG. 1E. Each major cutting edge 16 connects to a chip breaking recess 21, which is recessed relative to the plane P1, P2, in order to give the edge 16 a positive rake angle in order to cut easily in the workpiece. A hole 22 is provided centrally in the milling insert 10. A bisector B between associated major cutting edge 16 and minor cutting edge 17 intersects the center of the hole 22. The bisector B on the opposite side of the hole 22, facing away from the cutting corner 25, intersects the milling insert periphery between two of the points S1 and S2. The cutting edges 16, 17 connect to a strengthening bevel, which has one width along the main cutting edges 16 and the minor cutting edges 17 and a greater width at the nose edge 20 substantially symmetrically about the bisector B. Thereby the strength of the cutting corners is increased. A major cutting edge 16, opposed to a cutting corner 25, has an end 23 provided between two of the points S1 and S2. The milling insert 10 includes six pairs of associated main cutting edges 16 and minor cutting edges 17. The main cutting edge and the minor cutting edge in each pair connect to each other via the convexly curved nose edge 20. The upper side and the lower side form an edge angle that is 90° with the edge surfaces 13A-15B, that is, the milling insert has a negative basic shape. A centrally placed hole 22 is provided in order to receive a fastening device such as a screw at mounting in the milling body 40, such as illustrated in for example FIG. 2B. The minor cutting edge 17 projects in the range of about 0.02 to 1 mm from the plane P1, P2 of the support surface 18, 19. The milling tool according to the present invention includes the milling body 40 which has a number of insert pockets. Each milling insert pocket is intended to receive a milling insert 10 designed as describe above. Consequently, the basic shape of the milling insert pocket rectangular to hexagonal. Thereby an imaginary circle, not shown, inscribed in the milling insert pocket touches the milling insert pocket periphery at six points, not shown. In an alternative square milling insert pocket an imaginary circle, inscribed in the milling insert pocket, touches the milling insert pocket periphery at four points. In an additional alternative pentagonal milling insert pocket an imaginary circle, inscribed in milling insert pocket, touches the milling insert pocket periphery at five points.

Consequently, the present invention relates to an economically advantageous milling insert for milling, which enables rigid localization of the milling insert in the milling body and a milling tool.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is in no way limited to the above described embodiments but can be freely varied within the limits of the appended claims.

What is claimed is:

1. An indexable milling insert for milling substantially perpendicular corners in a work piece, the milling insert including an upper side, a lower side, and edge surfaces extending between the upper and lower sides, the upper and lower sides being substantially identical, wherein an imaginary circle inscribed in the milling insert touches a periphery of the milling insert at between four to six points, wherein lines of intersection between the edge surfaces and the upper and lower sides form substantially perpendicular main cutting edges and associated minor cutting edges, each of the upper and lower sides each including a respective support surface, each support surface being provided in a respective plane, wherein at least an extension of each major cutting edge intersects the plane of an associated one of the support surfaces, and each associated minor cutting edge is disposed above the plane of the associated one of the support surfaces.

2. The milling insert according to claim 1, wherein each minor cutting edge is remote from all of the points and each major cutting edge comprises at least a point of the points.

3. The milling insert according to claim 2, wherein a line that intersects a point on a major cutting edge and that intersects an associated minor cutting edge also intersects an associated one of the support surfaces.

4. The milling insert according to claim 3, wherein each minor cutting edge extends substantially parallel with the plane of the associated one of the support surfaces.

5. The milling insert according to claim 4, wherein each major cutting edge forms an acute angle with the plane of the associated one of the support surfaces.

6. The milling insert according to claim 5, wherein each major cutting edge forms an angle of 5-20° with the plane of the associated one of the support surfaces.

7. The milling insert according to claim 2, wherein each major cutting edge connects to a chip breaking recess which is recessed relative to the plane of the associated one of the support surfaces.

8. The milling insert according to claim 2, wherein a hole is provided centrally in the milling insert and a bisector between a major cutting edge and an associated minor cutting edge intersects the center of the hole.

9. The milling insert according to claim 8, wherein the bisector, on a side of the hole opposite the major cutting edge and the associated minor cutting edge, intersects the milling insert periphery between two of the points.

10. The milling insert according to claim 8, wherein a second major cutting edge opposite the first major cutting edge and the first associated minor cutting edge has an end provided between two of the points.

11. The milling insert according to claim 2, wherein the milling insert includes six pairs of main cutting edges and associated minor cutting edges and the main cutting edge and the minor cutting edge in each pair connect to each other via a convexly curved nose edge.

12. The milling insert according to claim 1, wherein a line that intersects a point on a major cutting edge and that intersects an associated minor cutting edge also intersects an associated one of the support surfaces.

13. The milling insert according to claim 1, wherein each minor cutting edge extends substantially parallel with the plane of the associated one of the support surfaces.

14. The milling insert according to claim 1, wherein each major cutting edge forms an acute angle with the plane of the associated one of the support surfaces.

15. The milling insert according to claim 14, wherein each major cutting edge forms an angle of 5-20° with the plane of the associated one of the support surfaces.

16. The milling insert according to claim 1, wherein each major cutting edge connects to a chip breaking recess which is recessed relative to the plane of the associated one of the support surfaces.

17. The milling insert according to claim 1, wherein a hole is provided centrally in the milling insert and a bisector between a major cutting edge and an associated minor cutting edge intersects the center of the hole.

18. The milling insert according to claim 17, wherein the bisector, on a side of the hole opposite the major cutting edge and the associated minor cutting edge, intersects the milling insert periphery between two of the points.

19. The milling insert according to claim 17, wherein a second major cutting edge opposite the first major cutting edge and the first associated minor cutting edge has an end provided between two of the points.

20. The milling insert according to claim 1, wherein the milling insert includes six pairs of main cutting edges and associated minor cutting edges and the main cutting edge and the minor cutting edge in each pair connect to each other via a convexly curved nose edge.

21. A milling tool comprising a milling body with a number of insert pockets, wherein each milling insert pocket is intended to receive a milling insert designed according claim 1.

* * * * *